United States Patent [19]

Rouverol

[11] Patent Number: 5,485,761
[45] Date of Patent: Jan. 23, 1996

[54] ARTICULATED DIFFERENTIAL CROWNING

[75] Inventor: William S. Rouverol, Berkeley, Calif.

[73] Assignee: Axicon Gear Company, Berkeley, Calif.

[21] Appl. No.: 283,635

[22] Filed: Aug. 1, 1994

Related U.S. Application Data

[63] Continuation-in-part of Ser. No. 43,375, Apr. 6, 1993, Pat. No. 5,341,699.

[51] Int. Cl.$^6$ .................................................. F16H 55/08
[52] U.S. Cl. ............................................ 74/462; 29/893.3
[58] Field of Search ........................... 74/462; 29/893.3, 29/893

[56] References Cited

U.S. PATENT DOCUMENTS

| | | | |
|---|---|---|---|
| 3,982,444 | 9/1976 | Rouverol | 74/462 |
| 5,083,474 | 1/1992 | Rouverol | 74/461 |
| 5,315,790 | 5/1994 | Kish et al. | 74/462 X |
| 5,341,699 | 8/1994 | Rouverol | 74/462 |

OTHER PUBLICATIONS

Technical Paper Titled "Differential Crowning: A New Weapon Against Gear Noise and Dynamic Load"—Appendix A; William S. Rouverol; pp. 1–12 & FIGS. 1–8, Prior Aug. 1, 1994.

*Primary Examiner*—Allan D. Herrmann

[57] ABSTRACT

A new system of modifications for power train gearing, called "differential crowning," has both advantages and disadvantages over the previous system of modifications based on tip and/or root relief. The advantages of differential crowning are three-fold: (1) it affords substantially constant stiffness, so that it is equally effective at all loads; (2) it is adapted to minimize both first and second harmonic excitations, whereas conventional modifications can mitigate only the first harmonic excitation, and that only at one "design load;" and (3), it is as insensitive to manufacturing inaccuracies as conventional gearing is sensitive to them. Differential crowning, however, has two disadvantages in its previously disclosed forms: (1) it is difficult to optimize; and (2), it is more expensive than conventional modifications unless the production runs are very large. The present invention discloses how these two disadvantages can be eliminated by utilizing articulated crowns of appropriate shapes and proportions.

66 Claims, 5 Drawing Sheets

ARTICULATED DIFFERENTIAL CROWNING

RELATED APPLICATION

This application is a continuation-in-part of my patent application Ser. No. 08/043,375, filed Apr. 6, 1993 now U.S. Pat. No. 5,341,699 and entitled "Zero Dynamic Increment Gearing."

BACKGROUND OF THE INVENTION

1. Field of the Invention

This invention relates to the shape of gear teeth. Specifically it relates to gearing having characteristics that eliminate transmission error at all loads, so that the dynamic increment of load is also eliminated at all loads. This eliminates the main harmonics of gear noise and also greatly increases torque capacity. The invention discloses how these desirable performance characteristics can be achieved by a means of an improved type of tooth modification manufacturable by methods that make the gears less expensive than conventional gears.

2. Prior Art

The invention comprises additions to and improvements on the concepts disclosed in U.S. Pat. No. 5,083,474 (hereinafter Reference 1) and my copending U.S. Pat. application Ser. No. 08/043,375 now U.S. Pat. No. 5,341,699 (hereinafter Reference 2) for which the issue fee has been paid. Reference 2 is not prior art, and I hereby incorporate by reference the entire content thereof into this application. The special performance advantage of the gearing disclosed in Reference 1, which is called "Zero Transmission Error" (ZTE) gearing, is greatly reduced noise. The special performance advantage of the gearing disclosed in Reference 2, which is called "Zero Dynamic Increment" (ZDI) gearing, is substantially improved torque capacity. Both these performance advantages, however, were achieved by a means that had two disadvantages: The first disadvantage in the disclosures of the cited References resides in the proposed crown forms. FIG. 10 in Reference 1 and FIG. 6 in Reference 2 disclose crown forms that are smooth continuous curves starting at the midline of the face width. The general mathematical form of these curves is that of a continuous exponential curve of the $Ax^n$ variety. There are three difficulties with such a crown form: (1) It has only two parameters, A and n, so that crown forms based on it can have only two precision points at which the static transmission error is zero; (2) the two parameters are locked together in a single expression, so that neither parameter can be iterated independently; and (3), the basic parabolic shape of the crown curves tends to produce a nonlinear load-deflection curve, whereas the need is for a load-deflection curve that is close to linear, because only one of the six sources of gear tooth deflection, the Hertz deflection, is nonlinear.

The second disadvantage in the disclosures of References 1 and 2 is that the special tooth surface modification pattern proposed, which was called "differential crowning," was a special form of what is generally called "topological modification." Unfortunately, there is only one grinder that has the capabilities to form topological modifications, either directly or by fabrication of specially designed shaving cutters. The company that made this special grinder has stopped production of it. Only about 30 or 40 of these grinders exist in the entire world, and nearly all of them are owned by companies that use them in-house for sharpening conventional shaving cutters. Because this special topological grinder is in such short supply and forms modifications in a slow, point-by-point manner, manufacturing costs for making the new gearing boded to be greater than that of conventional gearing.

In addition to the above-mentioned References 1 and 2, U.S. Pat. No. 3,982,444 (hereinafter Reference 3), may also be considered to be relevant prior art.

SUMMARY OF THE INVENTION

A primary objective of the invention is to disclose a form of gearing in which the differential crowning is simple enough to provide a generally used substitute for conventional tip and/or root relief. This is an important objective because gears with conventional forms of relief embody three important disadvantages: The first disadvantage is that such modifications are in all cases "load-specific." This means that because such gearing is given modifications to the transverse tooth profiles to compensate for the effects of tooth deflection under load, and because elastic deflections are inherently load dependent, conventional profile modifications can be designed to give a uniform velocity ratio only for one load magnitude. Loads different from the design load will give increased transmission error. A major objective of the present invention is therefore to eliminate most or all of this "load-specific" type of modification in favor of a form of modification that is substantially as simple but which will produce a transmission error that is zero or close to zero at all loads. With this improved form of modification, the gearing will be equally suitable for any load that is imposed. Since about 90% of all gearing is subjected to a varying torque load, this "all-load" feature will be highly advantageous in nearly every gearing application.

The second disadvantage of gearing with conventional tip and/or root relief is that in all cases it is "harmonic-specific," in that it can only reduce the transmission error peak that is responsible for the first harmonic of excitation. It is therefore an objective of the invention to disclose a form of differential crowning that without an increase in complexity or cost can eliminate both the main harmonics of gear excitation and noise (at one and two times the tooth contact frequency), and to do so for all torque loads.

The third disadvantage of gearing having conventional tip and/or root relief is that the same characteristics that cause it to generate increased transmission error at all loads that differ from the design load also cause it to be extremely sensitive to inaccuracies of manufacture. The reasons for this are explained in the technical paper "Differential Crowning: A New Weapon against Gear Noise and Dynamic Load" (hereinafter Appendix A). To eliminate this extreme sensitivity is a further objective of this invention, which is achieved with the aid of the improved form of differential crowning disclosed in this specification.

The most important objective of the present invention, however, is to disclose a special form of the ZTE and ZDI gearing disclosed in References 1 and 2 that can be manufactured on any of the many tens of thousands of hobbers, shapers, shavers, honers, lappers, non-topological grinders, etc., that are in operation in the many thousands of gear shops throughout the world. In addition this special form should, when manufactured on these universally available gear-making machines, have fabrication cycle times short enough so that finishing costs will be no more than those for conventional gearing made on the same machines. Then, because of the greater torque capacity of the ZDI gearing, the net cost of the new gearing on a "power density" basis will be significantly lower than that of conventional gearing.

DESCRIPTION OF THE PREFERRED EMBODIMENTS

Figure 1:
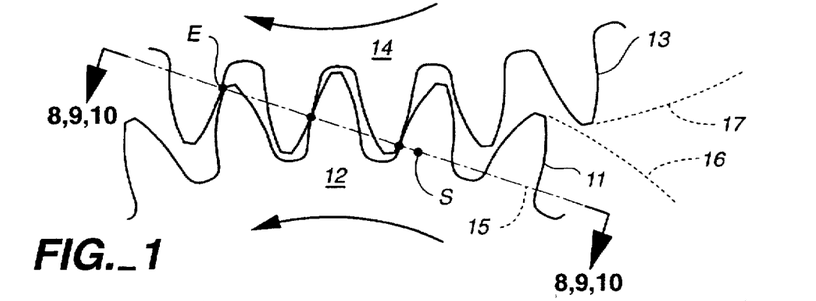
FIG. 1 is a partial section of a pair of mating gears embodying the invention, showing the transverse tooth profiles and indicating the directions of various additional views.

In detail and referring to the drawings, FIG. 1 is a partial transverse section through a pair of gears 12, 14 showing typical teeth 11, 13 embodying the invention, with arrows showing the direction of motion ("transverse" direction). Teeth 11 on the smaller of the mating pair (pinion 12) and teeth 13 on the larger of the mating pair (gear 14) make contact along a pressure line 15 that contains the path of contact extending from a starting point S and an ending point E. The active heights of the teeth 11, 13 terminate at the addendum circles 16, 17 of the pinion 12 and gear 14, respectively, and determine the position along the pressure line 15 of points S and E, which in turn govern the profile contact ratio. Other features of pinion 12 and gear 14, such as hubs, webs, rims, keyways, etc. are standard and are omitted in the interest of clarity.

Figure 8:
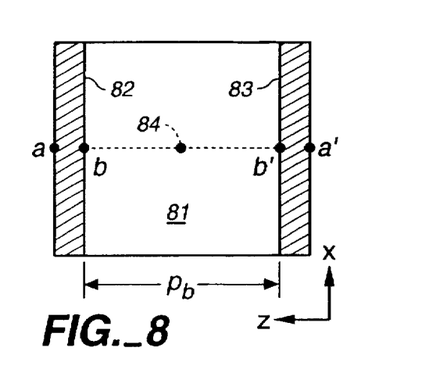
FIG. 8 is a diagram of the field of contact of a spur gear pair, showing by means of crosshatching the reduced domain in which profile relief (tip and/or root) may be utilized.
Figure 9:
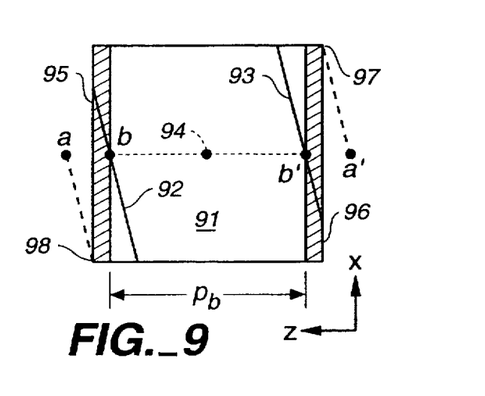
FIG. 9 is a diagram analogous to that of FIG. 8, but for a helical gear pair.
Figure 10:
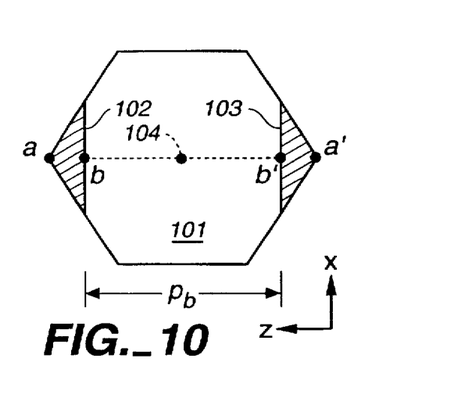
FIG. 10 is a diagram analogous to that of FIG. 8, but for a field of contact with a hexagonal shape.

The bent arrows in FIG. 1 show the direction of the FIG. 8, 9 and 10 views of the field of contact swept by the lines of tooth engagement of typical mating teeth for spur and helical gears, respectively. In these and other figures three linear measurement coordinates are used: x, y, and z. Of these, the x-coordinate defines the position of points in the axial direction, as indicated in FIGS. 8, 9 and 10. Normal to this direction, defining positions in the direction of movement of the contact points along path of contact S-E on line 15 in FIG. 1, is the z-coordinate. In systems of orthogonal coordinates the third variable, y, is normal to these x and z directions. In this specification, however, a different system of using the y dimension is employed: It represents modifications to the theoretical ideal profile or lead curve and is in the same direction as the z-coordinate, that is to say, in the direction of motion (the "transverse" direction). In addition, the scale used in representing these modification in the y direction is very much greater than that used for x and z. The scales for representations of x and z are typically between 1:4 and 4:1, whereas the scale for y is usually between 500:1 and 2000:1. Consequently plots of y as a function of x or z are called "diagrams" or "charts" rather than "drawings" or "graphs," and they are identical with what are called "inspection charts" commonly produced by commercial gear inspection machinery. It should further be noted that for involute gearing, equal increments of distance in the z direction of a profile or "involute" diagram correspond to equal increments of roll angle (in radians) times the base radius. Hence, positions of points in the z direction may be viewed as a function of either linear displacement z along a line such as pressure line 15 in FIG. 1 or as a function of the roll angle, which is linearly related to z and differs only by the constant base radius multiplier.

Profile or lead diagrams are used to specify the particular modifications y that are desired, and profile or lead inspection charts, as the case may be, are used to verify them: profile diagrams or charts, in which y is shown as a greatly magnified deviation from the straight line that represents the pure involute profile; and lead diagrams or charts, in which y is shown as a greatly magnified deviation from a straight line that is referred to as the "straight line generator." These two values of y are additive for both the pinion 12 and the gear 14, so the total modification at each point in the field of contact is the sum of four y components. Together they constitute what is called the "initial separation" at that point in the field of contact. The effect of initial separation on transmission error may be either favorable or unfavorable, depending on where it is introduced. Why this is so is explained in Appendix A and will be further explained in connection with FIGS. 2, 3 and 6.

Figure 2:
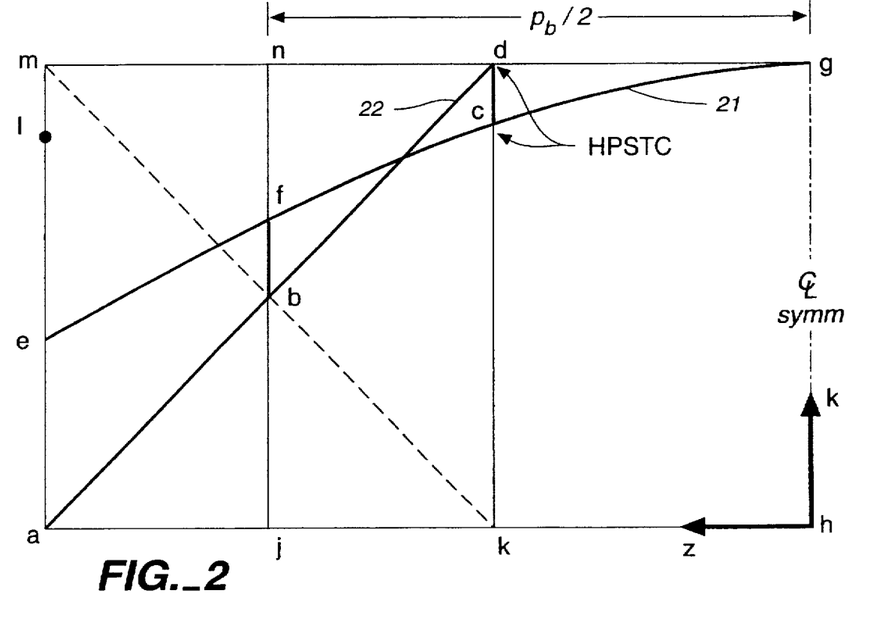
FIG. 2 is a graph of the left half of a typical plot of tooth pair stiffness as a function of transverse displacement along the path of contact. (The horizontal scale of this figure is about five times that of FIGS. 1, 8, 9 and 10.)

The graph of FIG. 2 shows the left half of a symmetrical diagram of tooth pair stiffness k plotted as a function of displacement z in the direction of motion (i.e., the "transverse" direction). The plot shows two stiffness curves, including a stiffness curve 21 that will be referred to in this specification as "uncorrected," and a second curve 22 that has had its stiffness k altered by what was called in References 1 and 2 "differential crowning." The largest alterations in curve 21 are at two points: (1) The stiffness is decreased at the roll angle corresponding to point j in the z-axis, by an increment f-b; and (2), the stiffness is increased at the roll angle corresponding to point k, by an increment c-d. The segment e-f on the uncorrected curve 21 is lowered to the line a-b by tip and/or root relief, which does not extend beyond the point b, at the end of what was referred to in References 1 and 2 as the "synchronization length." (In conventional gearing no differential crowning is used, so the tip and/or root relief is usually started twice as far from the end a of the path of contact, at the "HPSTC," the Highest Point of Single Tooth Contact.)

The stiffness corrections at j and k and the regions adjacent to them transform curve 21 into a curve such as 22, of which the left half contains the points a, b, d and g. Such a curve is called a "constant mesh stiffness curve," or in its optimum form, a "self-complementary curve." Such a curve has the unique property of giving a constant mesh stiffness when added to an identical curve that is offset from it by an integral number of base pitches. In order to have this characteristic, the "loading ramp" a-d must intersect the "unloading ramp" m-k of an adjacent tooth pair at their common midpoint b, to produce a constant combined stiffness segment m-n-d which is collinear with corrected stiffness segment d-g. The result is a gear mesh that is substantially free of static and dynamic transmission error, so there is no significant dynamic increment or gear noise at any speed.

It should be noted, however, that FIG. 2 is valid only for a particular load, because gear tooth deflection is not linear with respect to load. That is to say, when the load is doubled, the deflection is not quite doubled, increasing by a factor that is typically in the range 1.90 to 1.95. This means that to be fully effective, the particular differential crowning that is used to reduce the tooth pair stiffness at the roll angle of point j has two jobs: (1) It must reduce the tooth pair stiffness at full load by a specified amount; and (2), it must reduce the stiffness slightly less when the load is light. To satisfy these two requirements, the crown needs to have two parts: (1) A main part that controls the gross tooth pair stiffness; and (2), a secondary feature that produces minor adjustments to changes in load. A crown form that meets both of these requirements is charted in FIG. 3.

As is usually the case in the physical world, a difference in function calls for a difference in form. Although the crown charted in FIG. 3 appears much like what is called "tooth end relief," the purposes are different from that of conventional tooth end relief, and consequently the crown proportions are different and are also varied from one roll angle to another ("differential crowning"). Although a small fraction of the crowning used in gearing embodying the invention acts to reduce tooth end loading, the major portion of the crown is introduced to control tooth pair stiffness by taking advantage of the fact that stiffness is maximized by distributing the load as widely as possible, and minimized by approaching single-point loading.

Figure 4:
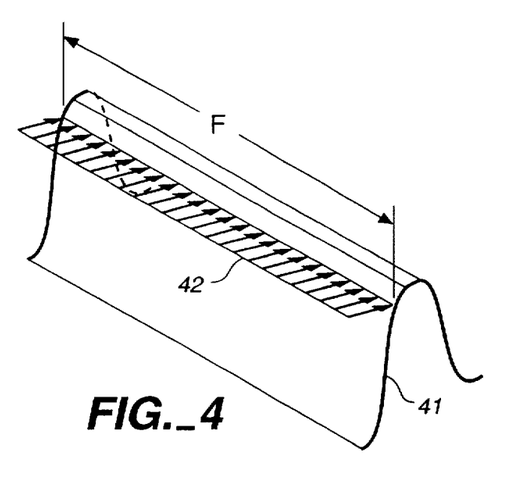
FIG. 4 is an isometric view of a typical spur gear tooth showing the distribution of load when there is no lead modification.

An example of this kind of effect may be seen in the equations for the deflection of a simply supported beam: When the load is concentrated at the center, the deflection is 60% greater than it is when the same load is evenly distributed over the full length of the beam. A similar effect is present in gear teeth, such as those shown in FIGS. 4 and 5. In FIG. 4 a typical spur gear tooth 41 is shown, together with a diagram 42 of the load distribution when there is no lead modification or lead error. The area 42 is essentially a rectangle, although the load at the ends of the tooth would normally be a few percent smaller than at the center of the tooth if the face width F is the same for pinion and gear and there is no axial offset.

Figure 5:
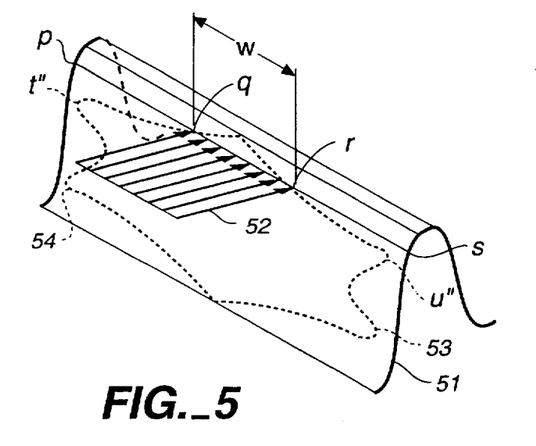
FIG. 5 is a similar view of a spur gear tooth showing the distribution of load at one roll angle when differential crowning is introduced.

In FIG. 5 the same tooth is shown (51), but in this case the working surface has differential crowning, so that the loaded width W is reduced. For the particular roll angle illustrated, the load distribution diagram 52 is still substantially rectangular and has the same total area as diagram 42 in FIG. 4, but the proportions of the rectangle are different. For reasons noted above, the narrower load distribution q-r will deflect the tooth significantly more than the distribution of FIG. 4. It is this particular characteristic of gear teeth that underlies the concept of using differential crowning to produce constant mesh stiffness.

FIG. 5 also shows two dotted lines 53, 54 which are the loci of the ends of the center segment of the articulated crown (FIG. 3) at various roll angles. As indicated in FIG. 2, to obtain constant mesh stiffness at the roll angle of point j, the tooth pair stiffness k must be reduced by the increment f-b, so the loaded width W is small (q-r). At the roll angle of point k in FIG. 2 the tooth pair stiffness must be increased by the increment c-d. This is done by increasing the length of the center segment to the distance between points t" and u" on loci 54 and 53 respectively. (See also FIG. 13.)

Figure 6:
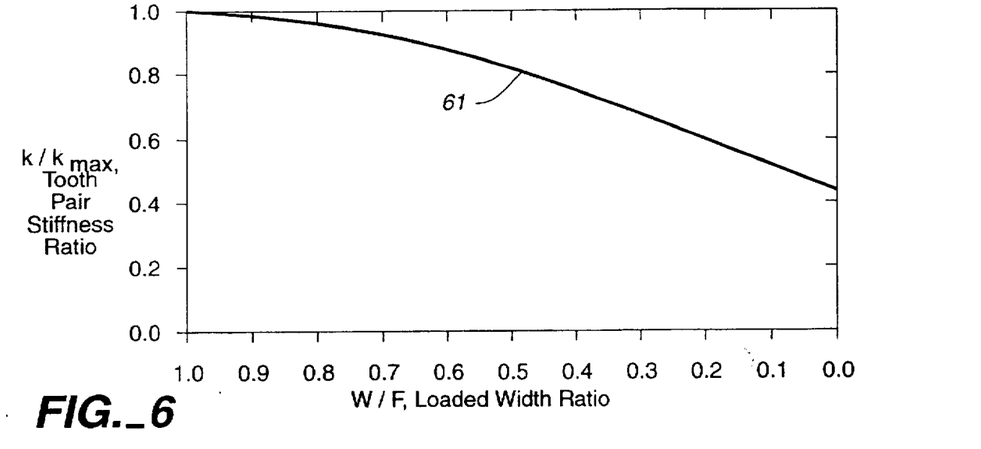
FIG. 6 is a graph showing how at a given roll angle the ratio of the tooth pair stiffness to the maximum value thereof varies with the ratio of the length of the center segment to the total face width for a crown curve such as shown in FIG. 3.

FIG. 6 shows a curve 61 produced by computer simulation outputs that give tooth pair stiffness values for a series of different values of loaded width W, normalized with respect to the maximum tooth pair stiffness and the maximum loaded width. For the particular gear set for which the tooth pair stiffness ratio is plotted, it will be seen that when the loaded width W is 50% of the total face width F, the tooth pair stiffness is about 80% of the value it would have if the loaded width W were equal to F. Referring back to the tooth pair stiffness curve of FIG. 2, it will be seen that this 20% reduction in stiffness is about what would be needed to reduce the stiffness ordinate j-f to the desired ordinate j-b.

What has been achieved by this narrowing of the loaded width W is a reduction of the mesh stiffness when two tooth pairs are in contact to the same value as when only one tooth pair is in contact. In addition, because the stiffness reduction at the roll angle of point j has been achieved with no recourse to initial separation over the loaded width W, the reduction will be substantially independent of load.

Figure 3:
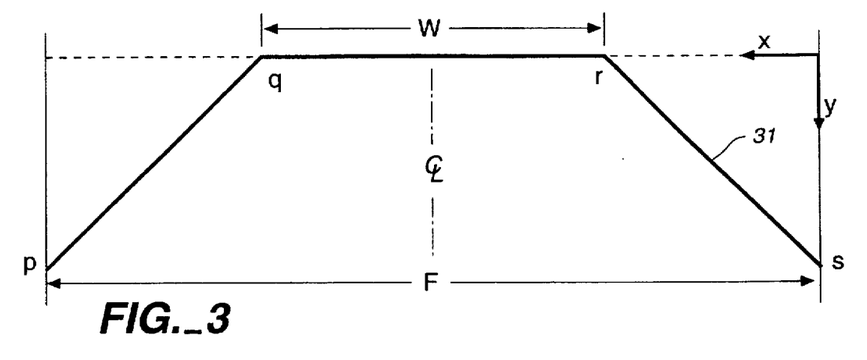
FIG. 3 is a diagram having the form of a typical inspection chart for one form of lead crown utilized in the invention, made up of three segments connected at two points of articulation.

The first of the two performance objectives of the differential crowning noted above is thus accomplished. The second, which is to make minor adjustments to changes in load, is achieved with the aid of the articulation of crown curve 31, at points q and r where the outer segments q-p and r-s make an angle, called the "articulation angle," with the center segment q-r. These discontinuities allow the slope of the outer segments q-p and r-s to be altered independently of the length of the center segment q-r, so that only a few iterations are needed to find the particular slope that gives an accurate adjustment of the mesh stiffness for changes in load. The final result is the unique crown that will give the ideal tooth pair stiffness at all loads for the particular roll angle at which it is introduced. A similar procedure may be followed for any or all roll angles throughout the full length of the path of contact, so that transmission error may be eliminated to whatever degree may be needed for any given application.

Figure 7:
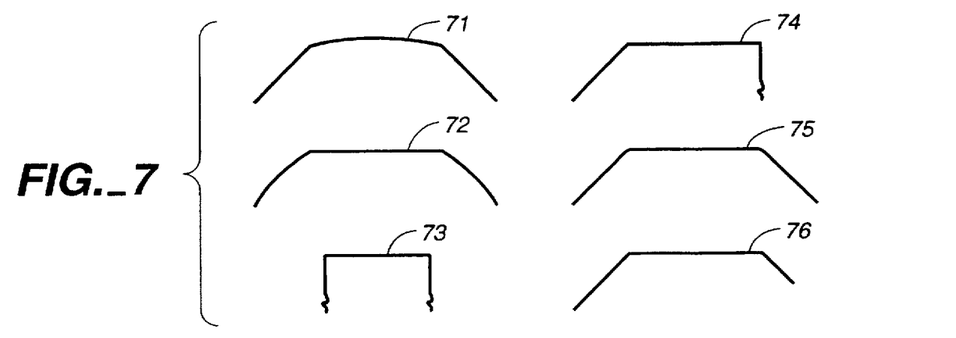
FIG. 7 shows, to a reduced scale, inspection charts for several alternatives to the inspection chart of FIG. 3 which may also embody the invention.

Although the crown made up of three straight segments charted in FIG. 3 is the simplest crown that embodiments of the present invention may include, a number of alternatives may be better suited for particular applications. Some of these are illustrated in FIG. 7. For example, if it is desired to reduce the amount of load adjacent to the articulation points, the center segment may be given a small amount of curvature as in crown 71. If it is desired to produce an additional "precision point" where the transmission error is zero at an intermediate load, the outer segments may be given a small amount of carefully calculated curvature such as shown in crown 72. If the length of the center segment is to be maximized or the face width is narrowed near the tooth tip as in the gear pair that has a hexagonal field of contact such as 101 of FIG. 10, the articulation angle between the outer segments and the center segment may go to ninety degrees, as shown in crown 73. If the contact line runs off the end of the tooth as in the helical gear field diagrammed in FIG. 9, one of the outer segments may make a large articulation angle with the center segment such as the angle between the line of contact and the circumferential direction at the tooth tip, as shown in crown 74. If the manufacturing process used in fabricating the gears tends to produce rounded corners, the junctions between the outer segments and the center segment may be rounded, as shown in crown 75, but ideally this rounding should be to radii smaller than the radii of curvature of both the center segment and the outer segments. In most cases the outer segments will be symmetrical, that is to say, one will be substantially a mirror image of the other. Crowns for bevel gearing, however, will ordinarily have outer segments of different lengths, as shown in crown 76.

FIGS. 8, 9 and 10 show, to a reduced scale, three fields of contact 81, 91, 101 that embody the invention. These diagrams all illustrate by crosshatching the reduced domain in which profile relief may be used in gear pairs that have differential crowning. Referring back to FIG. 2, conventional gearing is usually designed so that profile relief starts at point c (the HPSTC), so the amount of roll angle encompassed by the profile relief portion of the loading ramp is, for spur gears embodying the invention, typically about half that encompassed in conventional gearing, and for helical gears embodying the invention, may be partly or entirely supplanted by crowning. This entirely avoids the serious disadvantages described in Appendix A that are introduced by using initial separation at the roll angle of point b to reduce the excessive mesh stiffness present when an extra tooth pair is in contact. The system of modifications based on differential crowning gives a substantially constant tooth pair stiffness, so it is equally effective at all loads and eliminates the extreme sensitivity to manufacturing error that characterizes conventional power train gearing.

In the three fields of contact 81, 91, 101 diagrammed, the synchronization length is one base pitch, $p_b$, as indicated by the dotted line b—b'. This dotted line also coincides with a modification-free "high line" extending from b to b', and in all cases any profile relief specified is restricted to regions beyond the two lines of contact 82, 83; 92, 93; 102, 103 that are in positions of symmetry with respect to the field centroid, 84, 94, 104 respectively.

It will be evident that the field of contact diagrammed in FIG. 9 is for a helical gear pair, so the teeth are slantingly disposed with respect to the pitch line, just as they are in spiral bevel gears. The crowns lie in planes normal to the working surfaces and are collinear with the straight line generators of those surfaces. The domains in which profile relief is allowable are rectangular, and the points a, a' at the roll angles corresponding to the ends of the stiffness curve (FIG. 2 and its mirror image) are beyond the end boundaries of the field 95, 96. In many cases fields of this type may be designed with little or even no profile relief at all, since lines of contact enter and leave the field at its opposite corners 97, 98, and the outer segments of the crowns that would be centered at a and a' may provide sufficient ramp effect.

FIG. 10 shows a hexagonal field for a spur gear that has a gable shape for its addendum surface, such as illustrated in FIG. 10 of Reference 2. The particular advantage of this embodiment of the invention is that it will preserve the stiffness correction afforded by the steep-sided crown at b (73 of FIG. 7) despite wearing away of all working surface modifications as a result of very long service with less than optimum lubrication. The disadvantage of this gable form for the field of contact is that because the outer segments of the crown at the roll angles or b and b' in effect make an angle of ninety degrees with the center segment, they are not adapted to make minor adjustments for low loads.

The hexagonal field diagrammed in FIG. 10 will be seen to be substantially identical to the field shown in FIG. 10 of Reference 3. This is because the tooth silhouette is the same for both gear sets. The modifications, however, are not the same, because any used on the gears of Reference 3 would reflect a basic misconception, namely that tooth pair stiffness depends almost entirely on the length of the contact line. While contact line length is certainly a factor in the relationship between the tooth pair stiffness and loaded width ratios illustrated in FIG. 6, computer studies show that much more is involved. If nothing were involved except the width W (which is also, of course, the local contact line length), curve 61 would be a straight line running from the upper left corner of the graph to the lower right corner. Curve 61 clearly does not have this characteristic, because it accounts not only for contact line length, but also for profile relief, lead modifications, and tooth stiffness variations produced by changes in the height at which the tooth load is applied. (Local Hertz deflections and tooth base rotation due to bending and shear also affect tooth stiffness but are less important.)

When all of these sources of tooth stiffness variation are taken into consideration, it is found that the desired variation in contact line length is not the simple inverted V-shape shown in FIG. 10 and FIG. 10 of Reference 3. That basic form may be useful to ensure that the noise level and dynamic increment of load are never worse than those of a conventional helical gear pair no matter how much wear the working surfaces have been subjected to. But to produce a spur gear pair that is substantially superior to a conventional helical gear during its first years of operation, differential crowning of the working surface of at least one of the pair in the manner defined in References 1 or 2 or in the present specification must also be introduced. In other words, if the corners of the tooth are to be removed to produce a maximum contact field of the type shown in FIG. 10, this should be done in a way to avoid removal of any of the material inside the tooth working surface area bounded by the loci curves 53, 54 of FIG. 5.

In the preceding sections two aspects of articulated crowning have been discussed. These aspects are: (1) the number of different crowns introduced, and (2) some of the various shapes that these improved crown forms can be given. Two further aspects of articulated differential crowning will now be discussed: (1) the amounts or magnitudes that may be specified, and (2) the locations at which particular crowns should be introduced. (The term "magnitude" of a crown in this specification means the vertical distance between p or q in FIG. 3 and a horizontal line such as q-r extended that contains the high point of the center segment.) Aside from the above-mentioned special case wherein the angle between the crown segments is ninety degrees, the maximum magnitude of any of the crowns should be greater than (1) half the mesh deflection at full load and (2) three times the minimum magnitude of any of the crowns. To avoid detrimental tooth end loads, it is also desirable that the minimum magnitude of any of the crowns be greater than the sum of the lead error and misalignment over half the face width.

It will be evident from consideration of FIG. 3 that for a given angle between the outer segments and the center segment, the proportions of a particular articulated crown may be defined by either the length of the center segment or the magnitude. Where one of these characteristics is a maximum the other is automatically a minimum, so conversion is straight-forward. For design purposes, however, the length of the center segment is the most critical, because tooth pair stiffness is governed almost entirely by the shorter of the loaded lengths for pinion and gear. Consequently if an increase in stiffness is desired, the lengths of the center segments of both mating crowns must be maximized, that is to say, must occupy substantially the full width of the field of contact. And if a decrease in stiffness is desired, only the shorter of the center segments is relevant. These characteristics must be borne in mind when differential crowns are specified for transforming stiffness curve 21 in FIG. 2 into constant mesh stiffness curve 22.

These requirements must be noted when the characteristics of the differential crowns are specified with respect to location. Thus the crown with the shortest center segment will be located at the roll angle of point j in FIG. 2, which is at the end of the synchronization length. This crown will also automatically have the greatest magnitude. By the same token the crown having the longest center segment will usually be located at the inner end of the loading ramp, that is to say, at the roll angle of the point k. And for the reasons noted, it will also be the crown having the smallest magnitude. Between these extremes, there will be, for embodiments wherein the synchronization length is an odd number of base pitch lengths (in FIG. 2, the odd number is one), an intermediate crown that will govern the tooth pair stiffness at the roll angle of point h. This intermediate crown will have a center segment that is longer than that of the crown at the roll angle of either end of the synchronization length, but shorter than that of the crown at the roll angle of the inner end of the loading ramp. And as before, when the center segment is longer, the magnitude is smaller.

When the synchronization length is an even number of base pitch lengths (usually two), the gear pair is classified as an "HCR" set, where HCR is an acronym for High Contact Ratio. As noted in Reference 2, HCR gear pairs that embody the differential crowning concept will in most applications have a slightly greater torque capacity than "LCR" (Low Contact Ratio) gear pairs. Most HCR embodiments will have a profile contact ratio between two and three, so in terms of FIGS. 8, 9 and 10, each of the fields shown would have one more line of contact, parallel to those shown in each figure and containing the field centroid (84, 94, 104). The synchronization length doubles, so the dimension shown as $p_b$ becomes 2 $p_b$. For reasons noted in Reference 2, these extra lines of contact should have the same stiffness corrections as those applied to the outer lines of contact (82, 83; 92, 93; 102, 103), and the roll angles at which the stiffness corrections are made must be those that will synchronize all of the stiffness increases and all of the stiffness reductions.

To achieve this, the crown at the roll angle of the center of the synchronization length has for one of the pair a center segment at least as short, or a magnitude at least as great, as that of the crown at the roll angle of either end of the synchronization length. Similarly, a stiffening correction must be made for the central line of contact, and this means that each member of the gear pair must have a working surface with at least four different roll angles at which the crown has a center segment that occupies substantially the full width of the field of contact. It should be noted that if the loading ramp is given an S-shape such as the one shown in FIG. 2 of Reference 2, the greatest amount of stiffening may be slightly to the left of point c. In general, however, the maximum stiffening will be at a roll angle within the innermost quarter of the tooth tip loading ramp. The stiffening correction for the central contact line will in any case be at a roll angle one pitch angle smaller than that at the tooth tip, or one pitch angle larger than that at the tooth root. (These locations for the central stiffening corrections will be discussed in conjunction with FIG. 14.)

As in the LCR embodiment discussed above, the intermediate stiffness of the crowns for HCR gear pairs, at roll angles one half of a pitch angle smaller than the roll angle of the end of the synchronization length, is obtained by specifying a center segment that is longer (or a magnitude that is smaller) than that of the crown at the roll angle of the end of the synchronization length. By default it cannot be as long as that previously defined as "the longest" or "occupying substantially the full width of the field of contact."

In the "Summary of the Invention" section of this specification it was stated that one objective of the invention was to disclose a form of gearing in which the differential crowning was simple enough "to provide a generally used substitute for conventional tip and/or root relief." Although the differential crowning concept can be used to eliminate transmission error and dynamic increment at all phases of tooth engagement, many gearing applications are less demanding. For these applications only a simple correction of some of the limitations of conventional tip and/or root relief may be needed. For example, if the operating speed is near the critical speed for the first harmonic of excitation, satisfactory performance may be obtained by correcting the stiffness error at or near the roll angle of point b in FIG. 2. Or if the operating speed is a bit lower and the second harmonic is the most troublesome, correcting the stiffness error at or near the roll angle of point c in FIG. 2 may give an acceptable reduction of noise and vibration.

To achieve either of these simpler improvements, conventional tip and/or root relief (which in this specification is designated as "profile relief") must be replaced by two features: (1) The roll angle over which profile relief may be introduced is cut substantially in half, as illustrated in FIGS. 8, 9 or 10; and (2), differential crowning must be provided at the roll angle of the particular error (stiffness increment f-b or c-d in FIG. 2) that is to be eliminated. As noted above, any profile relief introduced should start at a contact line position that contains one end of the synchronization length, regardless of whether or not the teeth are "slantingly disposed with respect to the pitch line," or whether the gear pair is an LCR or an HCR set.

In connection with these location-specific corrections, it should be noted that in all gear pairs having a gear ratio greater than unity, the uncorrected tooth pair stiffness curve (e.g., 21 in FIG. 2) may be asymmetrical. Since it is necessary that the corrected or "self-complementary curve" 22 be symmetrical, this will usually require dissimilar crowns for the pinion and gear that equalize the tooth pair stiffness at the roll angles corresponding to points j and k and the analogous points j' and k' on the right half of the tooth pair stiffness curve (not shown).

At the other extreme so far as simplicity is concerned are embodiments that introduce not just two or three different crowns, but rather a continuous series of crowns proportioned to transform all parts of the uncorrected tooth pair stiffness curve (e.g., 21 in FIG. 2) into what was called in Reference 1 a "zero transmission error curve" (e.g., 22 in FIG. 2). This LCR example of such a curve contains points b, d and g and their mirror images about the ordinate g-h, and will have an infinite number of different crowns in one or both working surfaces over a range of roll angles encompassing as many pitch angles as there are base pitch lengths in the synchronization length.

As explained in Reference 2, there will be one particular zero transmission error (ZTE) stiffness curve that affords a maximum torque capacity, and this one is designated as a "self-complementary" stiffness curve. Some of the particular features that operate to maximize torque capacity are the following: (1) the number of teeth on one member of the pair should be within four teeth, and preferably two teeth, of the critical number of teeth for that member; (2) the smallest topland of either of the pair should have a transverse width of less than 0.3 modules, and preferably less than 0.26 modules; (3) the smallest clearance between the tip of the tooth of one of the pair and the root of its mate should be less than 0.25 modules, and preferably less than 0.20 modules; and (4), the profile contact ratio should be within 0.1 and preferably 0.05, of the critical profile contact ratio. While the "critical number of teeth" that balances the maximum bending stresses and Hertz stresses is a well-known prior art concept, the concept of a "critical profile contact ratio" is unique to gearing embodying the invention. This concept is intended to denote the particular profile contact ratio that maximizes torque capacity by minimizing the induced bending and Hertz stresses. If FIGS. 2, 3 and 6 are considered, it will be evident that even though an extra tooth pair is sharing the load at the roll angle of point j, if the stiffness correction increment f-b is too large the required reduction in Tooth Pair Stiffness Ratio (FIG. 6) concentrates the tooth load over a center segment length W that is so short that the Hertz stresses (and sometimes also the bending stresses) become excessive. Obviously minimizing the ordinate a-e in FIG. 1 will help, so the tooth toplands and root clearances should be minimized. Beyond that, at least three profile contact ratios should be compared to see what tooth proportions will ensure that the largest stresses occur when the roll angle is that of point k rather than that of point j.

The preceding sections of the present specification have focused on questions pertaining to the optimization of the shape of the teeth, the various forms of differential crowning that can be utilized, and where on the tooth working surfaces such crowns should be located. If the invention is to supersede conventional gearing for large numbers of applications, however, the cost of fabrication must be made competitive. In References 1 and 2 the proposed method of manufacturing differential crowns was to utilize topological grinding, either to finish the teeth directly or to manufacture shaving cutters to finish them by plunge shaving. While these methods of fabrication may be applied to the articulated differential crowns described above, the presence of the articulation opens up a much faster and more economical method of manufacture. This is a two-stage procedure that allows the gears to be made on all conventional gear fabrication equipment, rather than only on the very rare and expensive grinders needed to produce topological modifications. This special two-stage method of producing articulated differential crowns will be described with the aid of FIGS. 11 to 16 inclusive.

One of the most universally acknowledged taboos in the field of gear making is that on "positive relief." If any material projects above the involute working surface, it is a potential stress raiser and is therefore almost invariably avoided. In the case of gearing formed to have differential crowning, however, the intentional introduction of positive relief provided the key to a major breakthrough in fabrication technology.

Figure 11:
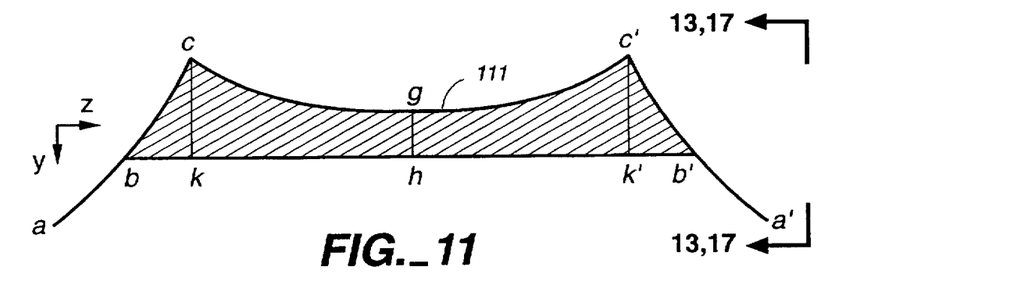
FIG. 11 is a profile chart of a gear tooth that is being fabricated according to the invention, showing the positive modifications after the first stage or "rough" cut, for an application having a tooth pair stiffness curve such as the one plotted in FIG. 2. The scale is about half that of FIG. 2.

FIG. 11 shows in an LCR example how positive modification can be used to obviate the need for topological grinding. Conventional gear making equipment is constructed so as to be able to form gear teeth having a single profile and a single crown. It cannot therefore, at least when conventional procedures are used, produce a gear that has a plurality of crown forms. To circumvent this limitation, a two-operation fabrication method has been devised, as follows. In the first operation, or "rough cut," the working surface is hobbed to a specifically designed common profile, which is depicted as involute chart 111 (a-b-c-g-c'-b'-a'). Most of this profile chart is above the involute line b—b', so the entire shaded area represents positive modification (i.e., surplus material projecting beyond the involute line). The entire working surface also has a common crown 131, which is shown as an articulated crown form similar to that of FIG. 3 but with the center segment q-r and outer segments q-p and r-s as indicated in the lower portion of FIG. 13.

Figure 12:
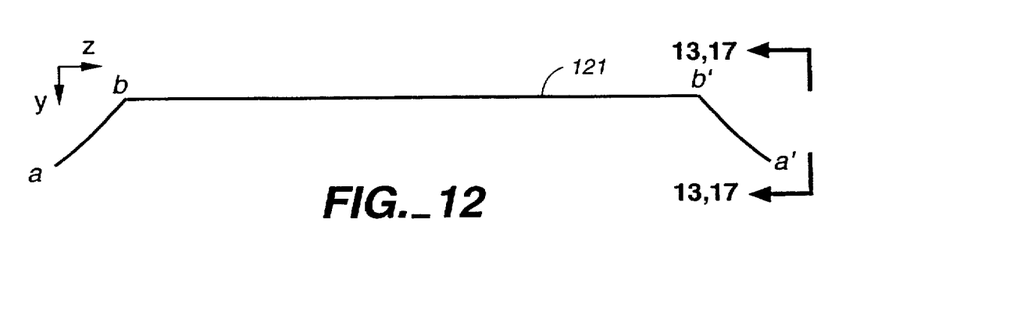
FIG. 12 is the profile chart of FIG. 11 after the second stage or "finish" cut.
Figure 13:
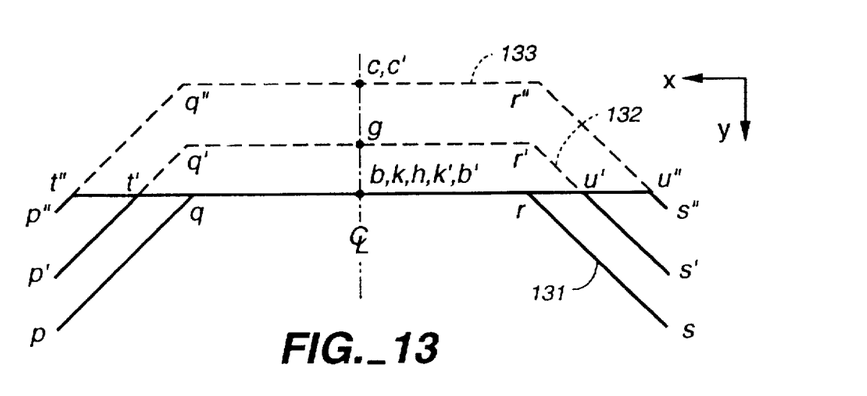
FIG. 13 is an end view of the FIGS. 11 and 12 profiles superimposed so as to show the crown shapes in broken and solid lines, respectively, after the first and second stages of material removal.

In the second fabrication operation, called the "finish cut," the positive modifications are removed down to the involute line by hobbing, shaving, honing, grinding, etc. As shown in FIG. 12, a substantially pure involute profile chart 121 (b—b'), with short segments of relief a-b at the tooth tip and a'-b' at the tooth root, is produced. But what has happened to the originally uniform crowning as a result of this finish cut is a carefully designed form of articulated differential crowning, as shown in FIG. 13. Because of the different amounts of positive modification (deviation from the involute line) formed in the rough cut (FIG. 11), the common crown is higher at c (133) and g (132) than it is at b (131). Thus where the positive modifications are removed, crowns 132 and 133 are in effect decapitated. The portions shown in broken line are removed, leaving only the portions shown in solid line. After the finish cut the crowns at c and c' have the form shown in FIG. 13 as p"-t"-u"-s". This will of course be the crown of maximum stiffness since its center segment t"-u" occupies substantially the full face width. At the other extreme, the crowns at b and b' in FIG. 11 will be unaffected by the finish cut, so like crown 131 they will have the shortest center segment q-r and the greatest flexibility. In between will be the crown p'-t'-u'-s' that has the intermediate stiffness needed at the roll angle of point h in FIG. 2. It will be noted that removal of the positive modification maintains the articulation in all crowns, as well as the slope of the outer segments, but gives these segments different lengths. Also, the amount of positive modification needed at c will be evident from FIG. 13: In order for the center segment of the finish cut crown to occupy substantially the full face width, the amount of positive modification needed at the roll angle of point c must be substantially equal to the magnitude of the first-stage crown.

The first-stage profile chart shown in FIG. 11 is one example of the many types of such charts that may be employed in the two-stage method of fabricating gears that have differential crowning. The positive modifications may be the same on both pinion and gear, to allow the same hob to be employed for both members, or all of the modifications may be on one of the pair. FIG. 11 could be either. If both members have modifications, the amount of stiffening or softening on each member at each roll angle may be discerned by tracing curve 111, and rotating the tracing 180 degrees about its center point h' to show how much positive modification is present on each member at each roll angle. As noted above, the maximum stiffening sought at roll angle k is achieved because the mating roll angle k' also has maximum stiffening.

Figure 14:
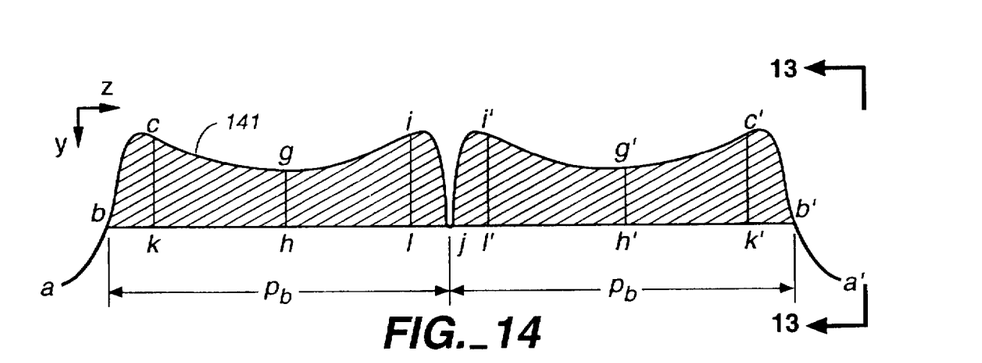
FIG. 14 is a profile chart such as that of FIG. 11, but for a high contact ratio application.

Another useful type of first-stage profile chart 141 is shown in FIG. 14. This one is for an HCR embodiment, so the reduction of stiffness at the roll angles of points b and b' is also introduced at the roll angle of point j, which is one base pitch inside the ends b, b' of the synchronization length. This roll angle is smaller than that at b and larger than that at b' by the pitch angle. Also, S-shaped loading ramps, a-b-c and a'-b'-c', are employed, of the type shown in FIG. 2 of Reference 2, so the high points (i.e., maximum stiffness points) are slightly removed from c, c' and i, i'. Although this curve 141 could be repeated on the mate, the mate, especially if it is larger, could also be formed so that the center segment occupies substantially the full face width, since this also would ensure that the four high points would all be mated with equally stiff crown configurations. The profile chart for the center of the teeth and the pattern of articulated differential crowns produced by the finish cut will be essentially as shown in FIGS. 12 and 13, respectively.

Figure 15:
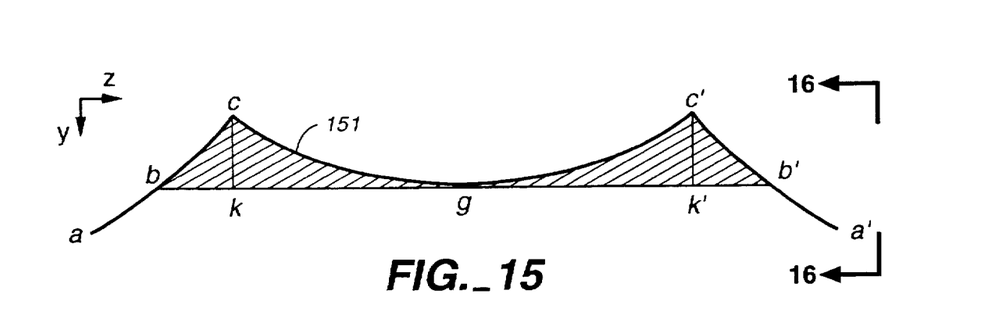
FIG. 15 is a profile chart such as that of FIG. 11, but for a helical gear pair.
Figure 16:
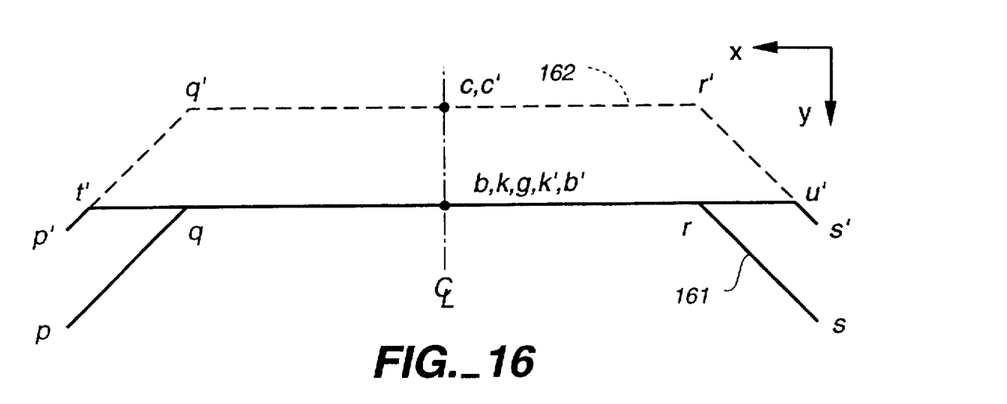
FIG. 16 is a view such as that of FIG. 13, but for the helical gear pair of FIG. 15.

The profile chart 151 shown as FIG. 15 is one of many possible variants of the invention that may be embodied in helical gear pairs (or by analogy in spiral bevel gears). Helical gears have the special feature (indicated in FIG. 9) that allows the mesh stiffness to be varied by varying the length of the outer contact lines 92, 93. This means that the tooth pair stiffness at the roll angle of point b in FIG. 2 may not require differential crowning. If the particular profile contact ratio that produces this effect is specified, a first-stage profile chart such as curve 151 can be obtained that has a reduced number of articulated differential crowns 161, 162 (FIG. 16). It should be noted, however, if the above-described two-stage method of forming the first-stage modifications is utilized, that a small amount of axial taper may be introduced so that the desired first-stage modifications will be formed to a profile 151 that is positioned progressively higher up the tooth working surface so as to follow the straight line generators at what is called in helical gear technology "the angle of inclination." Known methods of producing tooth taper (e.g., French Patent No. 521,076) are available, simply by advancing or retracting the hob in proportion to the cross feed. If desired, the addendum surface may be made slightly conical in order to maintain a constant whole depth for the teeth of both members.

Figure 17:
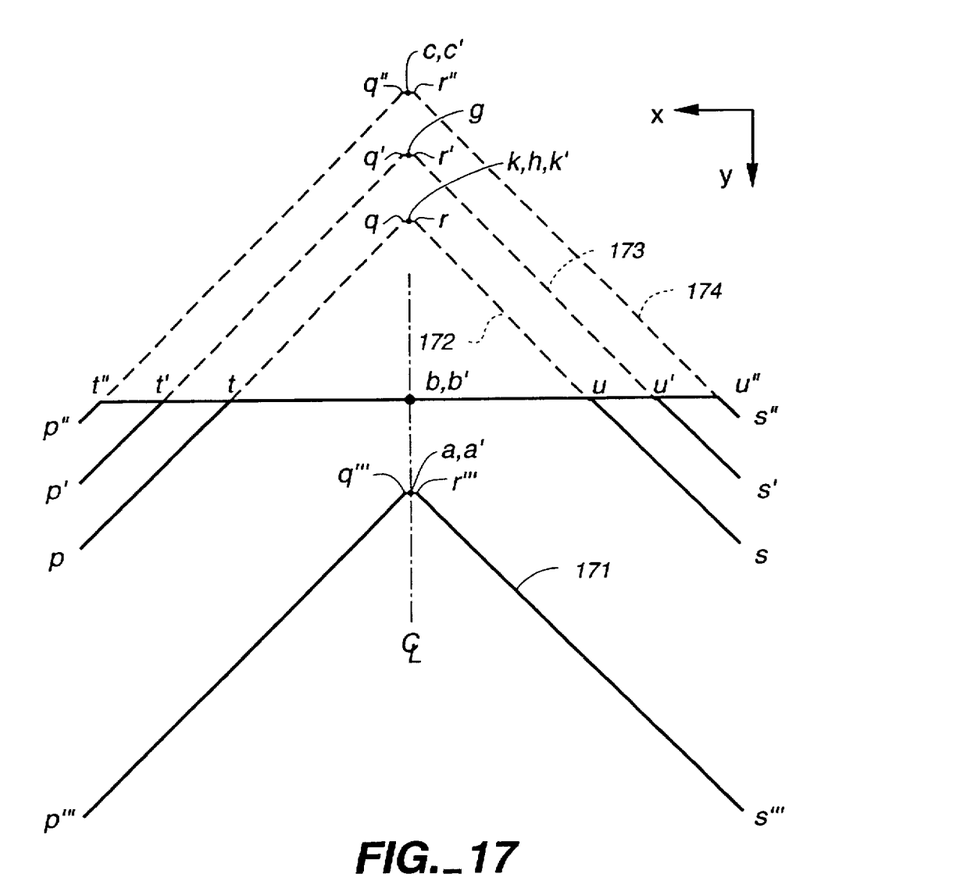
FIG. 17 is a view such as that of FIG. 13, but for an embodiment that is to have a special form of differential crowning.

FIG. 17 is a diagram similar to that of FIG. 13 (or FIG. 16), but for an embodiment that is to have part (or in some helical or spiral gears, all) of the profile relief supplanted by extending the differential crowning all the way to the points a and a'. When this is done, the amount of positive modification (shown shaded, under curves 111 in FIG. 11, 141 in FIG. 14 and 151 in FIG. 15) is approximately doubled by raising curves such as 111, 141, 151 by the vertical distance between points a and b. The magnitude of the common crown 171 is substantially doubled, so that it has a center segment q-r that is usually less than ten percent of the face width, or in the extreme case, substantially zero in length.

As in the case of the FIG. 13 diagram, the broken line portions of the common crowns 171, 172, 173, 174 are removed by the second stage "finish cut," to produce crowns having the same center segment lengths as in FIG. 13 and the various tooth pair stiffness ratios (FIG. 6) that are needed to transform the basic tooth pair stiffness curve (e.g., 21 in FIG. 2) into a constant mesh stiffness curve (22 in FIG. 2).

It is important to distinguish the present invention from known methods of applying "topological corrections" or "topological modifications" to conventional gears. Such corrections are most often a means to compensate for torsional deformation of a gear box or a method of selecting the optimum amount of relief for a single specific operating load (e.g., U.S. Pat. No. 5,315,790). Such conventional topological alterations to gear tooth working surfaces are ad hoc revisions that may afford modest reductions in transmission error and noise but do not constitute a systematic method of designing the transmission error out of a gear pair at all loads. This can be done only by the means and methods that are disclosed in References 1 and 2 and the present specification, which constitute a comprehensive system for achieving a constant mesh stiffness in a gear pair by introducing special tooth proportions and modifications that (1) synchronize the loading and unloading phases of tooth engagement and (2) transform the tooth pair stiffness curve into a curve that adds to itself to eliminate mesh stiffness variation. The use of differential crowning is an integral part of this new system of modifications and is essential to ensuring that the elimination of transmission error is equally effective at all loads and speeds.

There is another type of gear tooth form from which the present invention should be distinguished. As has been noted above, tooth end relief is often used to reduce the bending stresses at the ends of gear teeth. An example of this is shown in crown curve 102 of FIG. 10 in Reference 1. The fundamental difference between this end-relief type of crown from the crown form shown in FIG. 3 is in the loaded width ratio. If curve 61 in FIG. 6 is referred to, it will be seen that when the loaded width ratio is greater than about 0.9, as it is in the case of the above-mentioned curve 102, the tooth pair stiffness ratio is not "substantially" different from unity. Consequently the crowns proposed in Reference 1 include only crowns that either (1) do not have an articulation point that produces a substantial variation in stiffness (101, 102, 104), or (2), have no center segment (103, 105). Stiffness variation in the gearing of References 1 and 2 is produced entirely by variation in crown curvature, rather than by variation of the proportions of a system of articulated crowns.

The modification system described above is applicable to all gear forms except for a few restricted types that have single point contact, such as crossed helical gears. The foregoing specification is written mainly in terms of parallel-axis involute gears, but changes in the interpretation of the various features described are fairly obvious for other gear forms. For example, the "synchronization length" in straight or spiral bevel gears embodying the invention will obviously be measured along a circular arc. Or in conformal (W-N) gearing, it is measured in the axial direction, and the "differential crowning" will be applied to the circular arc concave-convex profiles. The claims enumerated below are intended to be construed to cover all applications of the invention in the various gear types in which tooth contact is in the form of one or more lines or areas.

In the foregoing specification and the ensuing claims the following terms are intended to have the following meanings: "differential crowning," "self-complementary," "tooth pair stiffness curve," and all other special terms defined in the References shall mean the same as in those References, with the exceptions or variants noted; "crown" means lead modification, even for the special case when that modification is zero, but not including W-N gearing for which "crown" appears as a profile modification; "loading ramp" is either of the end segments of the tooth pair stiffness curve starting at the point of initial tooth contact and ending at the highest point of single tooth contact ("HPSTC") for low contact ratio gears or the highest point of double tooth contact ("HPDTC") for high contact ratio gears; "unloading ramp" is the loading ramp at which the load leaves the tooth pair stiffness curve; "synchronization length" is an imaginary transversely extending line in the center of the field of contact connecting the midpoints of the loading ramps (at their average roll angle), and is an integral multiple of the base pitch except in the case of W-N gearing, for which it is an integral multiple of the axial pitch; "loaded width" is the length of the center segment of an articulated crown, even when that segment is slightly convex and the load is too light to produce contact over its entire length; "positive relief" or "positive modification" means excess material that projects above the ideal involute line or finished surface, or in non-involute gearing, above the theoretically correct profile form, in essentially the same way that a "grinding allowance" or "shaving allowance" does; "first-stage" and "second-stage" (or two "steps") refer to a sequence of manufacturing operations which in some cases, as for example if a gang hobber is used, may be carried out in a single pass; an "integral" number of units of length or angles means that if the total length or angle is divided by the units of length or angles, the quotient will be an exact integer or whole number; "loaded width ratio" for helical or spiral bevel gears is based on both W and F being measured in the same direction, whether it be axially or in the direction of the contact line; "substantially" means not different by more than twenty percent and preferably not more than ten percent; "face width" means the width of the face of a gear or pinion at a specified roll angle, and not the maximum face width if there is a variation; "inside," as referring to the location of a roll angle, means closer to the roll angle of the center of the synchronization length.

I claim:

1. A pair of gears having mating teeth with a working surface on at least one of said pair that has a first crown at a first roll angle and a second crown at a second roll angle, said second crown differing in form from said first crown, said first crown including (a) a center segment having a length substantially shorter than the face width at said first roll angle, and (b) two outer segments that make an articulation angle with said center segment.

2. A pair of gears having mating teeth with a working surface on at least one of said pair that has a first crown at a first roll angle and a second crown at a second roll angle, said second crown differing in form from said first crown, said first crown including (a) a center segment having a length substantially shorter than the face width at said first roll angle, and (b) two outer segments that make an articulation angle with said center segment, said second roll angle being located substantially at the inner end of one of the loading ramps, said first roll angle being located one half a pitch angle inside the roll angle of the end of the synchronization length closest to said second roll angle, the loaded width ratio of said first crown being substantially smaller than that of said second crown.

3. A pair of gears having mating teeth with a working surface on at least one of said pair that has a first crown at a first roll angle and a second crown at a second roll angle, said second crown differing in form from said first crown, said first crown including (a) a center segment having a length substantially shorter than the face width at said first roll angle, and (b) two outer segments that make an articulation angle with said center segment, said first roll angle being located substantially at the roll angle of one end of the synchronization length, said second roll angle being located one half a pitch angle inside said first roll angle, the loaded width ratio of said first crown being substantially smaller than that of said second crown.

4. A pair of gears having mating teeth with a working surface on at least one of said pair that has a first crown at a first roll angle, a second crown at a second roll angle and a third crown at a third roll angle, said first, second and third roll angles all being different from each other, said first, second and third crowns all differing in form from each other, at least one of said crowns including (a) a center segment having a length substantially shorter than the face width at the roll angle of said one of said crowns, and (b) two outer segments that make an articulation angle with said center segment, said second roll angle being located substantially at the inner end of one of the loading ramps, said first roll angle being located one half a pitch angle inside the roll angle of the end of the synchronization length closest to said second roll angle, said third roll angle being located substantially at the roll angle of one end of the synchronization length.

5. A pair of gears having mating teeth for which the uncorrected tooth pair stiffness at substantially all roll angles is altered by differential crowning of the working surface of at least one of said pair, said crowning consisting of a center segment having a length that varies continuously with roll angle and two outer segments that make an articulation angle with said center segment, said segments and said articulation angle being proportioned to substantially eliminate mesh stiffness variation at each of said roll angles at all torque loads.

6. A pair of gears according to claim 1, 2, 3, 4 or 5 wherein said center segment is curved.

7. A pair of gears according to claim 1, 2, 3, 4 or 5 wherein said outer segments are substantially straight.

8. A pair of gears according to claim 1, 2, 3, 4 or 5 wherein said outer segments are curved.

9. A pair of gears according to claim 1, 2, 3, 4 or 5 wherein one of said crowns extends across substantially the full width of the field of contact at the roll angle of said one of said crowns, said width being measured in the direction of the line of contact.

10. A pair of gears according to claim 1, 2, 3, 4 or 5 wherein said articulation angle is substantially ninety degrees.

11. A pair of gears according to claim 1, 2, 3, 4 or 5 wherein said articulation angle at one end of said center segment is the angle between the line of contact and the circumferential direction at the tooth tip.

12. A pair of gears according to claim 1, 2, 3, 4 or 5 wherein the junction between the center segment and an outer segment is rounded, but to a radius shorter than the radii of said center segment and said outer segment.

13. A pair of gears according to claim 1, 2, 3, 4 or 5 wherein the slope and curvature of said outer segments produces at least one, and preferably two, points of substantially zero transmission error at loads between zero and peak load.

14. A pair of gears according to claim 1, 2, 3, 4 or 5 wherein one of said outer segments is the mirror image of the other.

15. A pair of gears according to claim 1, 2, 3, 4 or 5 wherein the axes of said pair intersect and said outer segments have different lengths.

16. A pair of gears according to claim 1, 2, 3, 4 or 5 wherein at least two crowns have outer segments on one side of the midplane of one of said pair for which the outermost portions are substantially identical in shape and slope but different in length.

17. A pair of gears according to claim 1, 2, 3, 4 or 5 wherein the maximum magnitude of any of said crowns is greater than half the mesh deflection at full load.

18. A pair of gears according to claim 1, 2, 3, 4 or 5 wherein the maximum magnitude of any of said crowns is greater than three times the minimum magnitude of any of said crowns.

19. A pair of gears according to claim 1, 2, 3, 4 or 5 wherein the minimum magnitude of any of said crowns is greater than the sum of the lead error and misalignment for half the face width.

20. A pair of gears according to claim 1, 2, 3, 4 or 5 wherein said center segment is substantially straight.

21. A pair of gears according to claim 1, 2, 3, 4 or 5 wherein the crown having the greatest magnitude is located at the roll angle of the initial point of engagement.

22. A pair of gears according to claim 1, 2, 3, 4 or 5 wherein the crown having the longest center segment is located substantially at the roll angle of the inner end of the loading ramp.

23. A pair of gears according to claim 21 wherein said magnitude is substantially as great as the mesh deflection at peak load.

24. A pair of gears according to claim 1, 2, 3, 4 or 5 wherein the synchronization length is an odd number of base pitch lengths and the crown at the roll angle of the center of said synchronization length has a center segment that is longer than that of the crown at either end of said synchronization length.

25. A pair of gears according to claim 1, 2, 3, 4 or 5 wherein the center segments of the crowns at the roll angles of the ends of the synchronization length are substantially equal.

26. A pair of gears according to claim 1, 2, 3, 4 or 5 wherein the synchronization length is an even number of base pitch lengths and the crown at the roll angle of the center of said synchronization length has for one of said pair a center segment at least as short as that of the crown at the roll angle of either end of said synchronization length.

27. A pair of gears according to claim 1, 2, 3, 4 or 5 wherein the synchronization length is an even number of base pitch lengths and the crown at the roll angle of the center of said synchronization length has for one of said pair a magnitude at least as great as that of the crown at either end of said synchronization length.

28. A pair of gears according to claim 1, 2, 3, 4 or 5 wherein the synchronization length is an even number of base pitch lengths and each of said pair has a working surface with at least four different roll angles at which the crown has a center segment that occupies substantially the full width of the field of contact of said pair.

29. A pair of gears according to claim 28 wherein one of said four different roll angles is within the innermost quarter of the tooth tip loading ramp.

30. A pair of gears according to claim 1, 2, 3, 4 or 5 wherein the synchronization length is an even number of base pitch lengths and the crown at a roll angle one half of a pitch angle smaller than the roll angle of the end of the synchronization length has a center segment that is longer than that of the crown at the roll angle of said end.

31. A pair of gears according to claim 1, 2, 3, 4 or 5 wherein the synchronization length is an even number of base pitch lengths and the crown at a roll angle one half of a pitch angle smaller than the roll angle of the end of the synchronization length has a magnitude that is smaller than that of the crown at the roll angle of said end.

32. A pair of gears according to claim 1, 2, 3, 4 or 5 wherein the teeth of said pair are slantingly disposed with respect to the pitch line of said pair, and said crowns lie in planes normal to the working surface and are collinear with the straight line generators of said surfaces.

33. A pair of gears according to claim 1, 2, 3, 4 or 5 wherein profile relief is provided that starts at a contact line position that contains one end of the synchronization length.

34. A pair of gears according to claim 33 wherein the teeth of said pair are slantingly disposed with respect to the pitch line of said pair.

35. A pair of gears according to claim 1, 2, 3, 4 or 5 wherein no significant portion of the profile relief extends inside the two lines of contact that are the outermost lines of contact and are in positions of symmetry with respect to the centroid of the field of contact of said pair.

36. A pair of gears according to claim 1, 2, 3, 4 or 5 wherein the loading and unloading ramps of the tooth pair stiffness curve are both given an S-shape with the point of inflection of each ramp substantially at an end point of the synchronization length.

37. A pair of gears according to claim 33 wherein the field area occupied by said profile relief also has differential crowning.

38. A pair of gears according to claim 33 wherein the synchronization length is an even number of base pitch lengths and the crown at its center has a center segment at least as short as the center segment of the crowns at either end of said synchronization length.

39. A pair of gears according to claim 34 wherein the profile contact ratio is slightly greater than an integer, and profile relief having a magnitude not greater than half the mesh deflection at peak load is provided.

40. A pair of gears according to claim 34 wherein the profile contact ratio is slightly smaller than an integer, and no profile relief is provided.

41. A pair of gears according to claim 34 wherein said teeth are tapered in the lengthwise direction.

42. A pair of gears according to claim 34 wherein the toplands of said teeth lie in a frustoconical surface.

43. A pair of gears according to claim 1, 2, 3, 4 or 5 wherein both of said gears have in the central portion of their working surfaces a continuous line that is substantially modification-free and extends radially between roll angles differing by at least one pitch angle.

44. A pair of gears according to claim 1, 2, 3, 4 or 5 wherein the uncorrected tooth pair stiffness curve is asymmetrical but said gears have dissimilar crowns that produce substantially equal tooth pair stiffness at the ends of the synchronization length.

45. A pair of gears according to claim 1, 2, 3, 4 or 5 wherein the uncorrected tooth pair stiffness curve is asymmetrical but said gears have dissimilar crowns that produce substantially equal tooth pair stiffness at the inner end of the loading ramp.

46. A pair of gears according to claim 1, 2, 3, 4 or 5 wherein the number of teeth on one of said pair is within four teeth, and preferably two teeth, of the critical number of teeth for said one of said pair.

47. A pair of gears according to claim 1, 2, 3, 4 or 5 wherein the smallest topland of either of said pair has a transverse width of less than 0.3 modules, and preferably less than 0.26 modules.

48. A pair of gears according to claim 1, 2, 3, 4 or 5 wherein the profile contact ratio is within 0.1, and preferably 0.05, of the critical profile contact ratio.

49. A pair of gears according to claim 1, 2, 3, 4 or 5 wherein the smallest clearance between the tip of the tooth of one of said pair and the root of the other of said pair is less than 0.25 modules, and preferably less than 0.20 modules.

50. A pair of gears according to claim 1, 2, 3, 4 or 5 wherein the number of teeth, the proportions of the teeth, and the lengths of the center segments of the differential crowns have the values that produce a self-complementary tooth pair stiffness curve.

51. A pair of gears according to claim 1, 2, 3, 4 or 5 wherein one of said pair has no variation in crown form.

52. A pair of gears according to claim 51 wherein said one of said pair is at least as large in pitch diameter as the other of said pair.

53. A pair of gears according to claim 1, 2, 3, 4 or 5 wherein said one of said pair has a plurality of roll angles at which the crown has a center segment that occupies substantially the full width of the field of contact and the other of said pair has roll angles that mate with said plurality and also have crowns for which the center segments occupy substantially the full width of the field of contact of said pair.

54. A pair of gears according to claim 1, 2, 3, 4 or 5 wherein the tooth thickness of each of said pair is tapered in the axial direction.

55. A pair of gears according to claim 1, 2, 3, 4 or 5 wherein the two crowns having the shortest center segment are both on one of said pair and are at substantially different roll angles.

56. A pair of gears according to claim 1, 2, 3, 4 or 5 wherein the crown at all roll angles throughout the working surface of one of said pair has a center segment that occupies substantially the full width of the field of contact of said pair.

57. A method of forming the teeth of at least one of a pair of mating gears that includes two steps, the first of said steps being one that shapes the working surface to have (1), a transverse profile chart that has, at different roll angles, profile portions displaced by different amounts of positive modification from a straight line representing the basic rack, and (2), an axial lead formed to a first-stage crown that includes a center segment and two outer segments that make an articulation angle with said center segment, the second of said steps being one that removes said profile portions and in so doing lengthens said center segment at at least one roll angle and produces a plurality of different crown proportions.

58. A method as defined in claim 57 wherein said second step lengthens said center segment at at least two roll angles.

59. A method as defined in claim 57 wherein said second step lengthens said center segment at substantially all roll angles except those beyond the ends of the synchronization length.

60. A method as defined in claim 57 wherein the magnitude of said first-stage crown is substantially equal to the largest of said amounts of positive modification.

61. A method as defined in claim 57 wherein the length of said center segment is less than ten percent of the face width of said one of said pair.

62. A method of forming a gear for use in a power transmission or motion transmission gearing assembly, said gear having a plurality of teeth with each tooth having a tooth face with a crown, said method comprising the step of:

forming said crown on said tooth face with a width dimension selected to be less than the width dimension of said face at selected roll angles of said tooth to substantially reduce transmission error in said gearing assembly.

63. The method as defined in claim 62 wherein, said forming step is accomplished by forming said crown with a width dimension at selected roll angles to produce substantially zero transmission error.

64. The method as defined in claim 62 or 63 wherein, said forming step is accomplished by forming said crown with a central crown segment having the selected width dimension and two outer crown segments downwardly articulated from opposite sides of said central crown segment.

65. The method defined in claim 64 wherein, said forming step is accomplished by forming said central crown segment and said two outer crown segments as substantially planar segments.

66. The method as defined in claim 64 and the step of:

forming said two outer crown segments of said crown to be articulated relative to said central crown segment by an amount selected to produce substantially constant tooth mesh stiffness for changes in tooth loading.

\* \* \* \* \*